(12) United States Patent
Suurballe

(10) Patent No.: US 6,802,014 B1
(45) Date of Patent: Oct. 5, 2004

(54) METHOD AND APPARATUS FOR MANAGING POWER IN COMPUTER SYSTEMS

(75) Inventor: David Suurballe, San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 513 days.

(21) Appl. No.: 09/696,908

(22) Filed: Oct. 26, 2000

(51) Int. Cl.$^7$ .................................................. G06F 1/26
(52) U.S. Cl. ......................... 713/300; 700/286; 307/31
(58) Field of Search ............................... 713/300, 320, 713/324, 330; 307/31; 700/286

(56) References Cited

U.S. PATENT DOCUMENTS

| | | | | |
|---|---|---|---|---|
| 5,251,320 A | * | 10/1993 | Kuzawinski et al. | 713/324 |
| 5,752,050 A | * | 5/1998 | Hernandez et al. | 713/330 |
| 5,919,263 A | * | 7/1999 | Kikinis et al. | 713/320 |
| 5,925,134 A | * | 7/1999 | Solomon | 713/324 |
| 5,987,614 A | * | 11/1999 | Mitchell et al. | 713/300 |
| 6,105,097 A | * | 8/2000 | Larky et al. | 710/314 |
| 6,272,644 B1 | * | 8/2001 | Urade et al. | 713/320 |
| 6,281,601 B1 | * | 8/2001 | Edelman et al. | 307/29 |
| 6,377,874 B1 | * | 4/2002 | Ykema | 700/286 |
| 6,541,879 B1 | * | 4/2003 | Wright | 307/31 |

FOREIGN PATENT DOCUMENTS

JP         2000232452 A   *   8/2000   ........... H04L/12/28

OTHER PUBLICATIONS

Universal Serial Bus Specification, Revision 1.1, Sep. 23, 1998.*

* cited by examiner

Primary Examiner—Thomas Lee
Assistant Examiner—Mark Connolly
(74) Attorney, Agent, or Firm—Stattler Johansen & Adeli LLP

(57) ABSTRACT

The invention is directed towards minimizing power consumption in computer systems. One embodiment of the invention is a power management system that is used for a computer system that has at least one device and one power domain. This embodiment uses two different power managers to manage the power consumption of the device and the power domain. Specifically, this embodiment has (1) a first power manager that determines when to change power state of the device, and (2) a second power manager that determines when to change power state of the power domain. Each of these power managers decides to change power state of its corresponding device or domain based on information from several different sources. These sources can include power-management clients and power managers of related domains or devices.

18 Claims, 14 Drawing Sheets

METHOD AND APPARATUS FOR MANAGING POWER IN COMPUTER SYSTEMS

BACKGROUND OF THE INVENTION

Numerous power management schemes have been proposed for managing the power consumption of computer systems. Such schemes typically power down idle devices in order to save power and reduce heat. Power conservation is especially important in portable computers that need to maximize their battery life.

FIG. 1 illustrates a conventional power management scheme. This power management scheme 100 utilizes a single centralized power manager to control the power consumption of its computer system. This power management scheme includes a power manager 105, several power management clients 110, and several device drivers 115. As shown in FIG. 1, the device drivers control several devices 120 of the computer system.

The power manager 105 is a centralized piece of software that controls the power consumption of the devices 120. Specifically, this manager communicates with device drivers 115 and with certain devices 120, in order to receive information about the operational states of the devices 120. Based on these operational states and on the power manager's knowledge of the hardware devices, the power manager determines when to change each device's power state.

The power management clients 110 can also order the power manager to change the device power states. For instance, the power management clients might order the power manager to put the system to sleep based on a user's manual request or the computer's automated sleep setting. In portable computers, the power management clients 110 might also request the power manager to put the system to sleep when the battery level is critically low. As shown in FIG. 1, the power manager 105 directly orders certain devices (e.g., device 4 in this figure) to change their power states, while ordering other devices through the device drivers 115.

The centralized power management scheme of FIG. 1 has several disadvantages. For instance, it requires one centralized power manager module to know how to communicate with the device drivers and in some instances with the devices themselves. This, in turn, complicates the development and maintenance of the power manager module. The power manager needs to be modified each time a device driver is modified or a new one is added. Moreover, the power manager needs to have detailed information about the operation of the devices. This manager also needs to know the hierarchical relationship between the devices. These requirements, in turn, complicate the structure and operation of the power manager.

Therefore, there is a need in the art for a distributed power management method. Ideally, this method should simplify the structure and operation of the power management system, and impose minimal development and maintenance requirements.

SUMMARY OF THE INVENTION

The invention is directed towards minimizing power consumption in computer systems. One embodiment of the invention is a power management system that is used for a computer system that has at least one device and one power domain. This embodiment uses two different power managers to manage the power consumption of the device and the power domain. Specifically, this embodiment has (1) a first power manager that determines when to change power state of the device, and (2) a second power manager that determines when to change power state of the power domain. Each of these power managers decides to change the power state of its corresponding device or domain based on information from several different sources. These sources can include power-management clients and power managers of related domains or devices.

BRIEF DESCRIPTION OF THE DRAWINGS

The novel features of the invention are set forth in the appended claims. However, for purpose of explanation, several embodiments of the invention are set forth in the following figures

FIG. 14 illustrates a process that the root power manager performs when the computer system turns on.

DETAILED DESCRIPTION OF THE INVENTION

Figure 1:
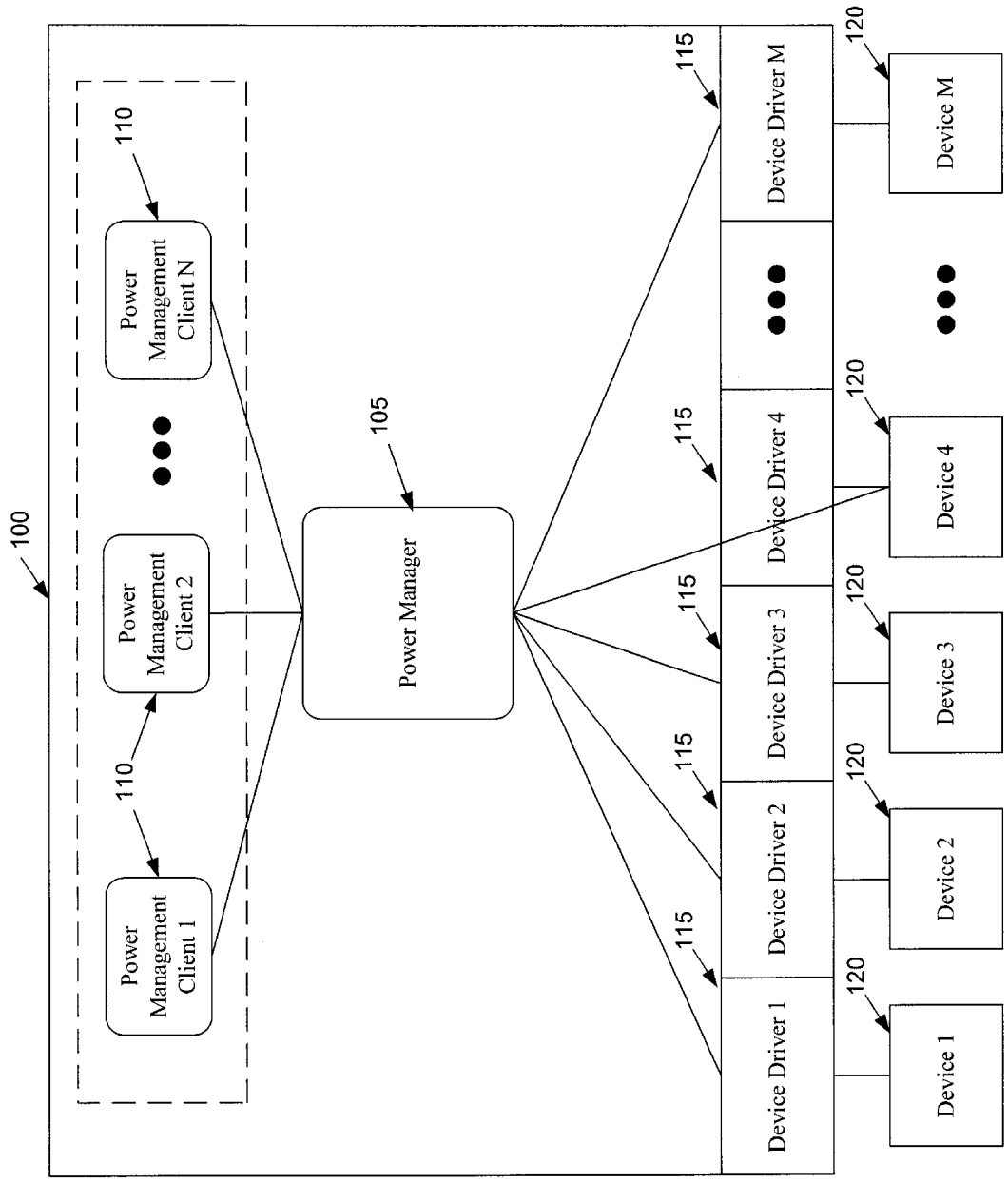
FIG. 1 illustrates a convention power management scheme.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

The invention is directed towards minimizing power consumption in computer systems. This minimization, in turn, saves power, reduces heat, and maximizes battery life in portable computers. The invention minimizes power consumption by altering the power usage of "devices" and "power domains," in a manner that does not interfere with the use of the computer systems.

A "device" is a hardware entity in the computer system. Disk drives and displays are examples of devices. A device typically has two or more power states. When a device's power is dependent on the system power, the device typically maintains some kind of state that needs to be saved and restored across changes in system power.

Two power states that devices often have are (1) the "on" state, where the device uses maximum power and has complete functionality, and (2) the "off" state, where the device uses no power and has no capability. Some devices also have other intermediate power states. In a reduced power state, a device (1) might be usable but at some lower level of performance or function, or (2) might not be usable but still retain some configuration or state.

An internal disk drive is an example of a device with more than the two simple power states. In its highest state, it is completely on. The disk drive can also be placed in the next lower state by turning off the drive motor. There is no state or configuration that needs to be saved during this transition. The drive electronics can also be turned off by turning off the entire domain, which supplies the drive. This transition does require state and configuration saving.

A "power domain" is a switchable source of power in the computer system. Such a domain typically provides power for some number of devices or domains, which are members of the power domain. When a power domain is off, all of its members are also off. Like devices, each power domain typically has at least two power states, on and off, and it may have additional intermediate states in which its members have some reduced capability.

Power domains are often hierarchical. In other words, one power domain may contain other child power domains, each of these child power domains may contain other child domains, and so on. In some embodiments of the invention, the hierarchical power schemes have one power domain, called the root power domain, that represents the main power of the computer system. In other embodiments, however, the hierarchical power schemes have multiple root power domains that define multiple sources of power in a computer system. Such multiple root power domains can define multiple dependent or independent hierarchical power relationships.

Figure 2:
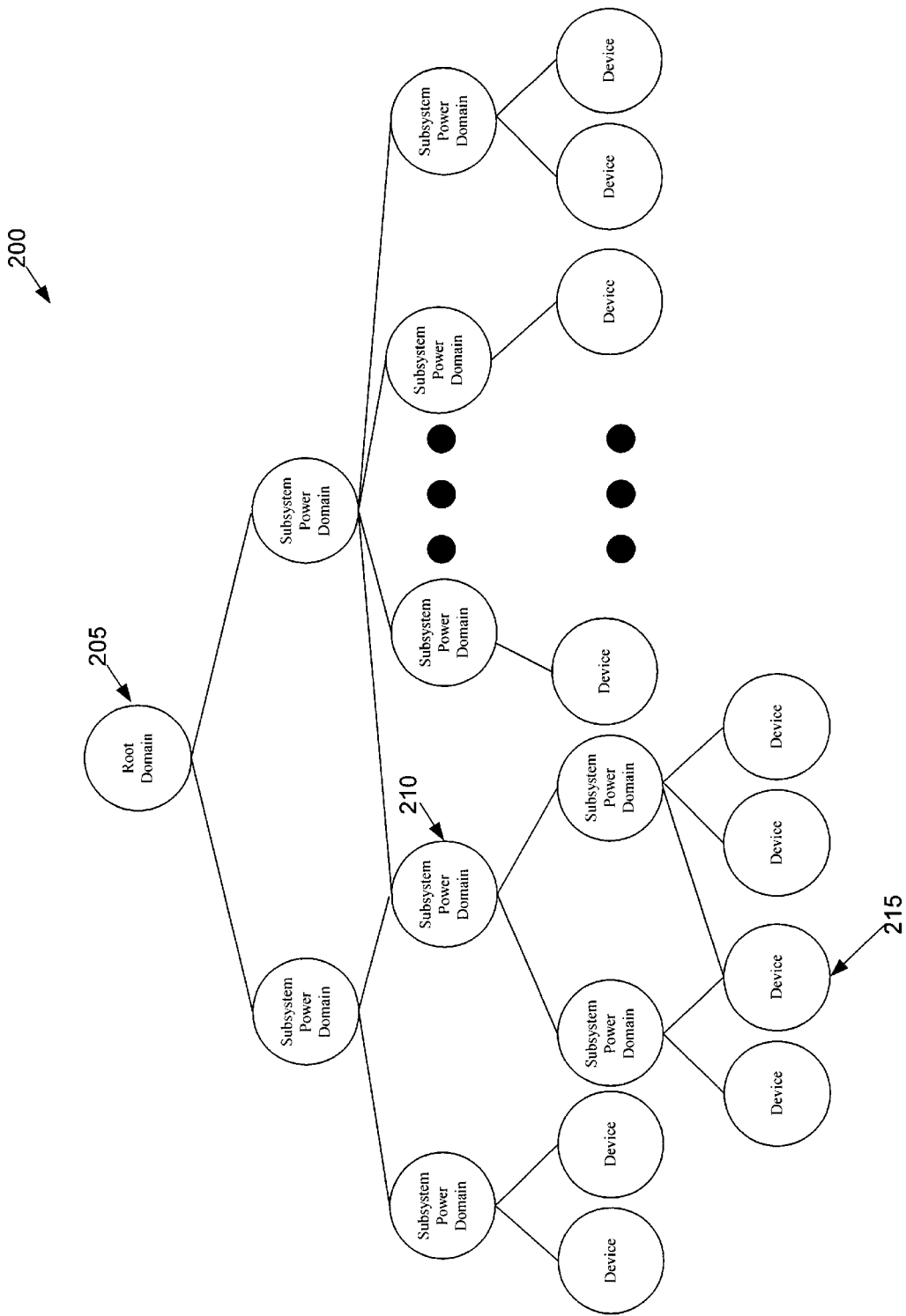
FIG. 2 illustrates an example of a hierarchical power domain of a computer system.

FIG. 2 illustrates an example of a computer system's hierarchical power domain 200 that includes only one root power node 205. As shown in this figure, each power domain can have one or more child domains or devices. The PC card system is an example of a power domain within another power domain. It provides power to its member devices, the PC card slots, and it is itself a member of a larger power domain, the root power domain. In addition, as illustrated by child domain 210 and device 215, each child domain or device can be part of one or more parent domains. Moreover, each hierarchical branch can be arbitrarily deep as shown in FIG. 2.

Figure 3:
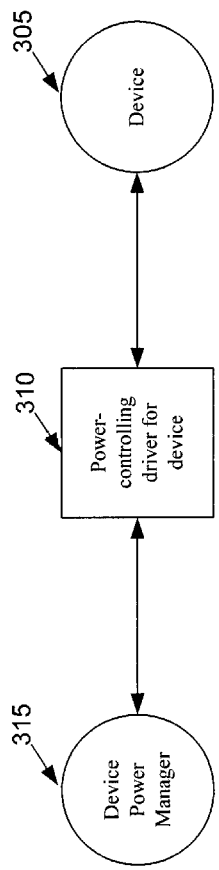
FIG. 3 illustrates one manner of controlling the power of a particular device in some embodiments of the invention that utilize a distributed power management scheme.
Figure 4:
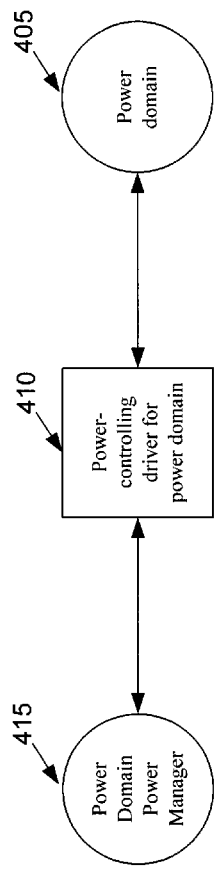
FIG. 4 illustrates one manner for controlling the power usage of a power domain in some embodiments of the invention that utilize a distributed power management scheme.
Figure 5:
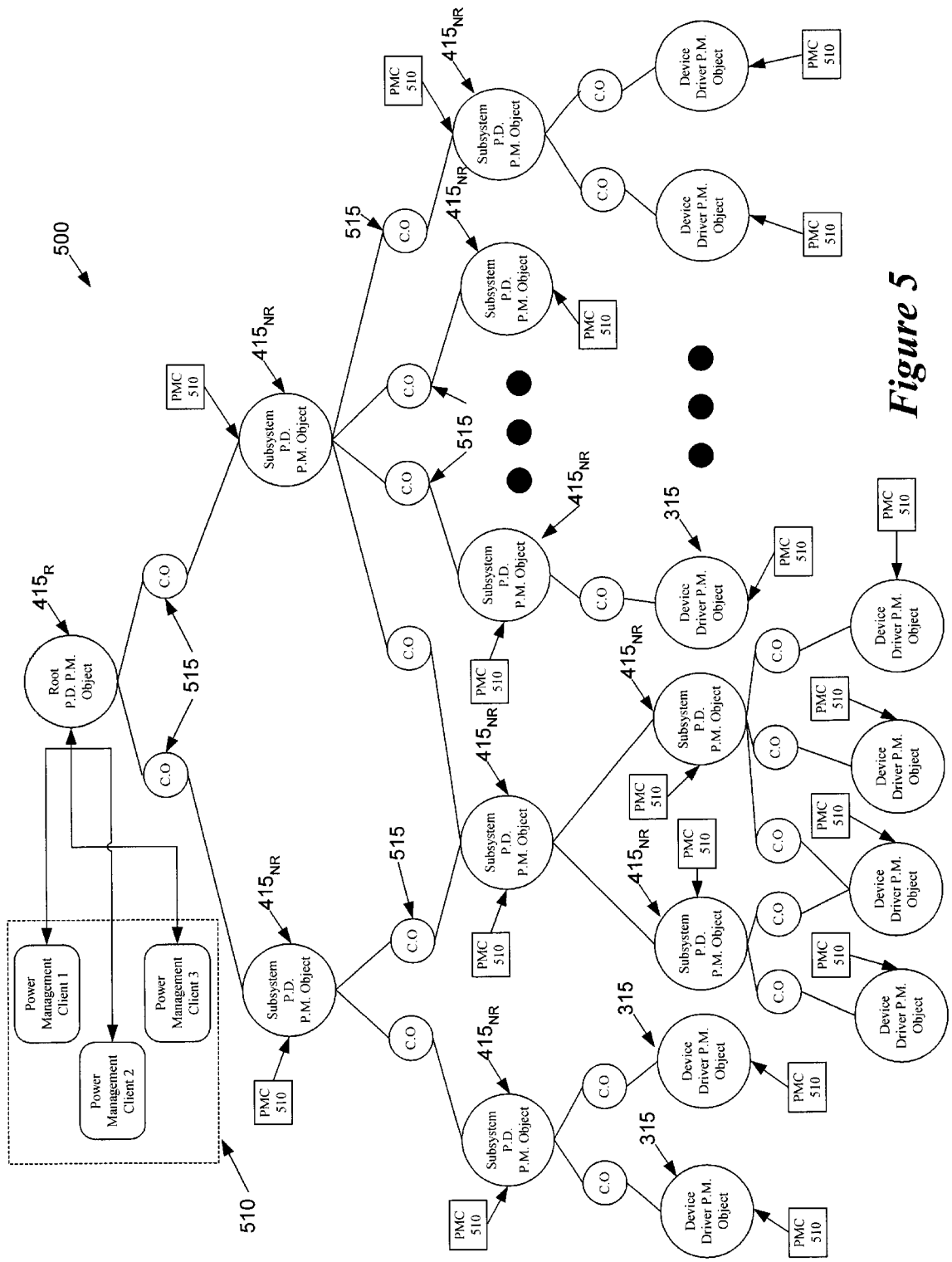
FIG. 5 illustrates a power-manager object hierarchy that corresponds to the hierarchical power domain of FIG. 2.

Some embodiments of the invention are distributed and hierarchical power management architectures for controlling the power consumption of computer systems. FIGS. 3–5 illustrate one example of such architecture. FIG. 3 illustrates how this architecture controls the power usage of a particular device. As shown in this figure, this scheme includes a power-controlling driver 310 and a power manager 315 for each device 305. The power-controlling driver knows about the various power states of the device and can direct the device to switch between them. In some cases, this driver also monitors the usage of the device.

In some cases, the power manager 315 also monitors the usage of the device. In addition, the power manager 315 is responsible for directing the power-controlling driver 310 to instruct the device 305 to switch power states. The power manager determines when to change the device's power state. The power manager makes this determination based on information that it receives from the driver, from its device's power domain, or from some component (e.g., a power management client) of the computer system.

For instance, when the device 305 becomes idle, the power manager recognizes the operational status of the device through the power-controlling driver 310 (e.g., the driver notifies the power manager of the idle status of the device). After analyzing this operational status, the power manager might decide that the device can tolerate a lower power state, and thereby it might instruct the power-controlling driver to lower the device's power state.

A power manager might also decide to change its device's power state when the power manager receives information (such as information about the user's keyboard or mouse activity) from a power management client. In addition, the power manager might also instruct the power-controlling driver 310 to change its device's power state, when it receives new output power characteristics for the device's power domain.

In some embodiments, a device's power manager receives the output power characteristics for the device's power domain or domains from power managers of the power domain or domains. A power domain's power manager is presented in FIG. 4.

FIG. 4 illustrates one manner for controlling the power usage of a power domain 405. As shown in this figure, the power domain 405 can be controlled very much like the device 305. Specifically, a power manager 415 and a power-controlling driver 410 can be used to control the power to the power domain 405. The power-controlling driver 410 knows about the various power states of the domain 405 and can direct the domain to switch between them. The power manager 415, on the other hand, is responsible for (1) determining when to change the power domain's power state, and (2) instructing the power-controlling driver 410 to direct the domain 405 to switch power states when it needs to do so.

One difference between the power management of the power domain 405 and the device 305 is that the driver 410 and power manger 415 alter the character of the power that supplies the members of the power domain, instead of altering the power consumption of a device. Another difference is that, in some embodiments of the invention, the power manager 415 and power-controlling driver 410 of a power domain do not have any idle judgment (i.e., they do not decide whether their power domain is idle or not). In these embodiments, (1) the power domain's manager 415 only decides to raise and lower power in its domain based on requests from its members (i.e., the power manager's of its power domain's children), and if applicable, its parent power domain, and (2) the driver 410 directs its domain to switch power states. Typically, the power manager 415 maintains the power domain in the lowest state that all of its children (i.e., its member devices and/or power domains) can tolerate.

In some embodiments, the power managers 315 and 415 and the power-controlling drivers 310 and 410 are data objects subclassed from a common class. In some of these embodiments, the methods associated with these objects perform power management procedures that allow the objects to communicate with each other in order to control the computer system's power usage.

Moreover, in some embodiments, the power managers are linked to form a hierarchy that mimics the computer system's power hierarchy. Specifically, in these embodiments, the power managers of the power domains link to the power managers of their parent and child domains and devices in the power hierarchy. Similarly, the power managers of the devices link to the power managers of their parent power domains. Consequently, in these embodiments, the power managers form a hierarchy that resembles the system's power hierarchy.

FIG. 5 illustrates a power-manager hierarchy 500 that corresponds to the hierarchical power domain of FIG. 2. In this power-manager hierarchy, each power manager is a data object. This hierarchy has three types of power manager objects, which are: the root power-domain power manager object $415_R$, the power-domain power manager objects $415_{NR}$, and the device power manager objects 315.

In this object hierarchy, the device power manager objects 315 are linked to the devices 305 (in the hierarchical power domain 200 of FIG. 2) through their corresponding power-controlling drivers 310. Similarly, each power-domain power manager object $415_R$ or $415_{NR}$ is linked to its corresponding domain 405 (in the hierarchical power domain 200 of FIG. 2) through it corresponding power-controlling drivers 410.

As shown in FIG. 5, each power-manager object 315 or 415 can interface with one or more power-management clients 510. The methods associated with these objects allow them to field calls from their respective power management clients. These calls can then direct these object to inform their child objects, their domains, and/or their devices to turn on or off, or to go to sleep.

The power-management clients for the root node typically are concerned with the power usage of the entire computer system. In other words, the calls from these clients often direct the root object to inform its child power-manager objects to turn the system on or off, or to put the system to sleep. The power-management clients for the non-root nodes, on the other hand, are typically concerned only about the power consumption of their respective domains or devices.

Figure 6:
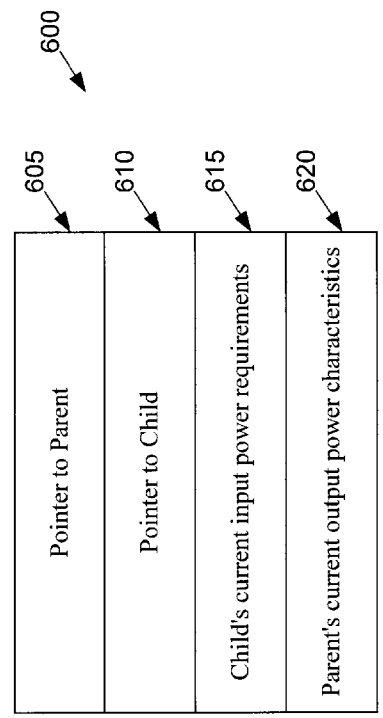
FIG. 6 illustrates the data structure of a connecting object used in the power-manager hierarchy of FIG. 5.

As further shown in FIG. 5, some embodiments of the invention utilize connecting objects 515 to link each parent and child power-manager objects in the hierarchy 500. FIG. 6 illustrates a connecting object's data structure 600 for some embodiments of the invention. As shown in FIG. 6, this data structure includes pointers 605 and 610 to the parent and child objects of the particular connecting object.

This structure 600 also includes fields 615 and 620 that respectively store the child's current input power requirements, and the parent's current output power characteristics. As further described below, the parent power-manager object stores the child's input power requirements in the connecting object, while the child's power-manager object stores the parent's current output power characteristics in the connecting object.

Figure 7:
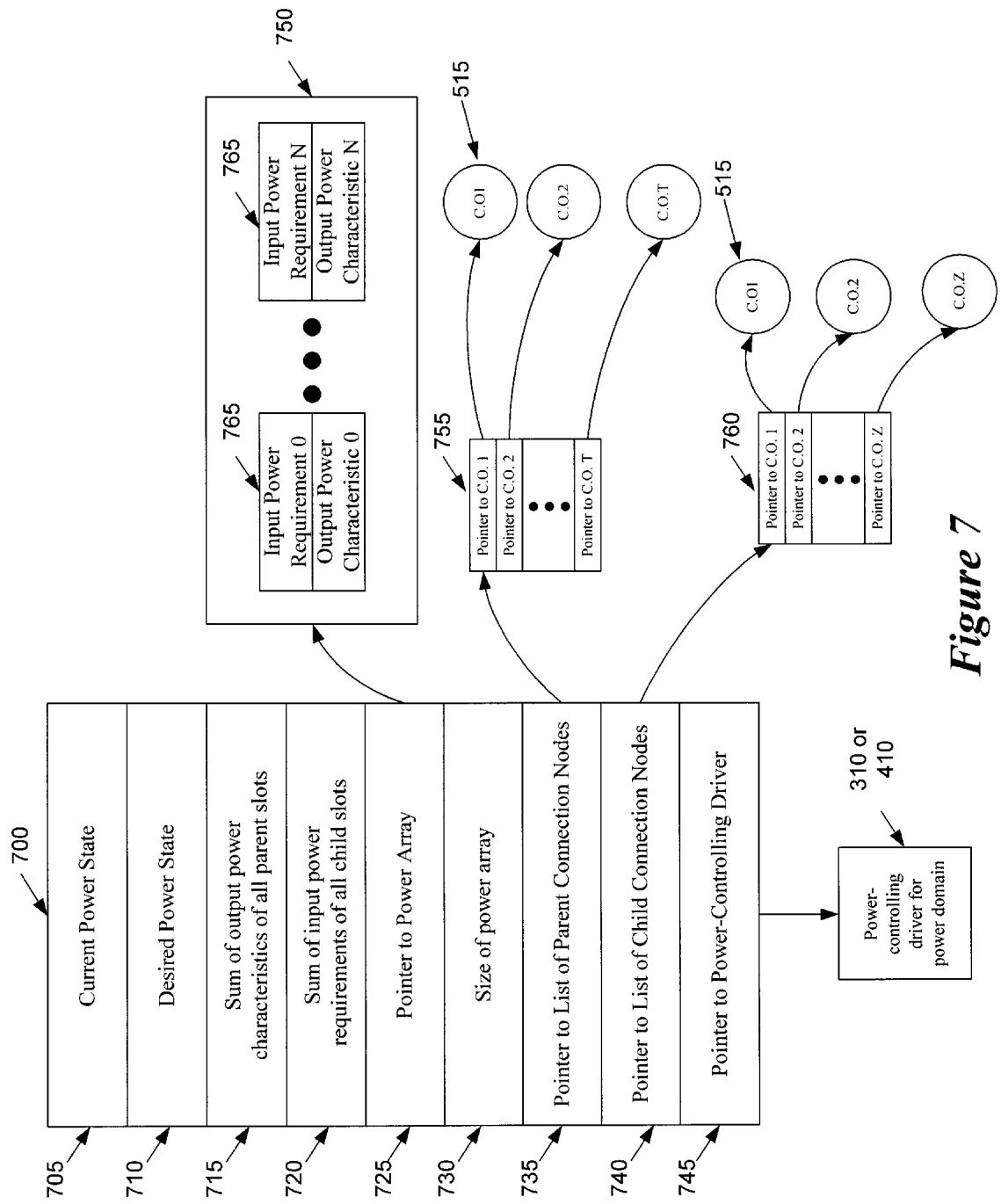
FIG. 7 illustrates the data structure for a power manager object.

FIG. 7 illustrates a power-manager object's data structure 700 that is used in some embodiments of the invention. As shown in this figure, this data structure includes (1) a data field 705 for storing the current power state of the manager's corresponding device or domain, (2) a data field 710 for storing the desired power state of the manager's corresponding device or domain, (3) a data field 715 for storing the aggregate output power characteristics of the manager's parent power domain or domains, and (4) a data field 720 for storing the aggregate input power requirements of the manager's child domains and/or devices. A power manager object for a device also includes an activity field (not shown) that the power manager can use to ascertain whether the device has been idle.

As shown in FIG. 7, the power-manager data structure 700 also includes a pointer 725 to a power array 750. This data structure also includes a field 730 indicating the size of the power array 750. The power array has one entry 765 per power state of the corresponding domain or device (i.e., the size of the array equals the number of power states of the corresponding domain or device). Each entry 765 in the array stores the input power requirement and output power characteristic of the power manager's domain or device in that state. Each state's input power requirement specifies the power that the manager's domain or device needs from its parent in order to operate in that state. Also, each state's output power characteristic specifies the output power that the manager's domain can provide in that state.

In some embodiments, the input power requirements specify the type of power-draining signals that a device or domain need in order to operate in a particular state, while the output power characteristics specify the type of power-draining signals that a domain can provide in a particular state. Power-draining signals are any type of signals that drain the computer system's power. Clock signals and operational power signals (e.g., voltage signals) are examples of such power-draining signals.

FIG. 7 illustrates that the power-manager data structure 700 further includes a pointer 745 to the power-controlling driver 310 or 410, which can control the power state of its device or domain. This data structure also includes (1) a pointer 735 to a list 755 that identifies (i.e., refers to) the power manager's parent connecting objects, and (2) a pointer 740 to a list 760 that identifies the power manager's child connecting objects. The parent and child connecting objects 515, in turn, connect the power manager object to the power manager objects of one or more parent or child domains or devices.

Some embodiments of the invention power down the computer system in one of two ways. First, they power down the system when the devices have been inactive for a particular duration of time. Second, they power down the system when a power management client orders the root power manager to do so.

Figure 8:
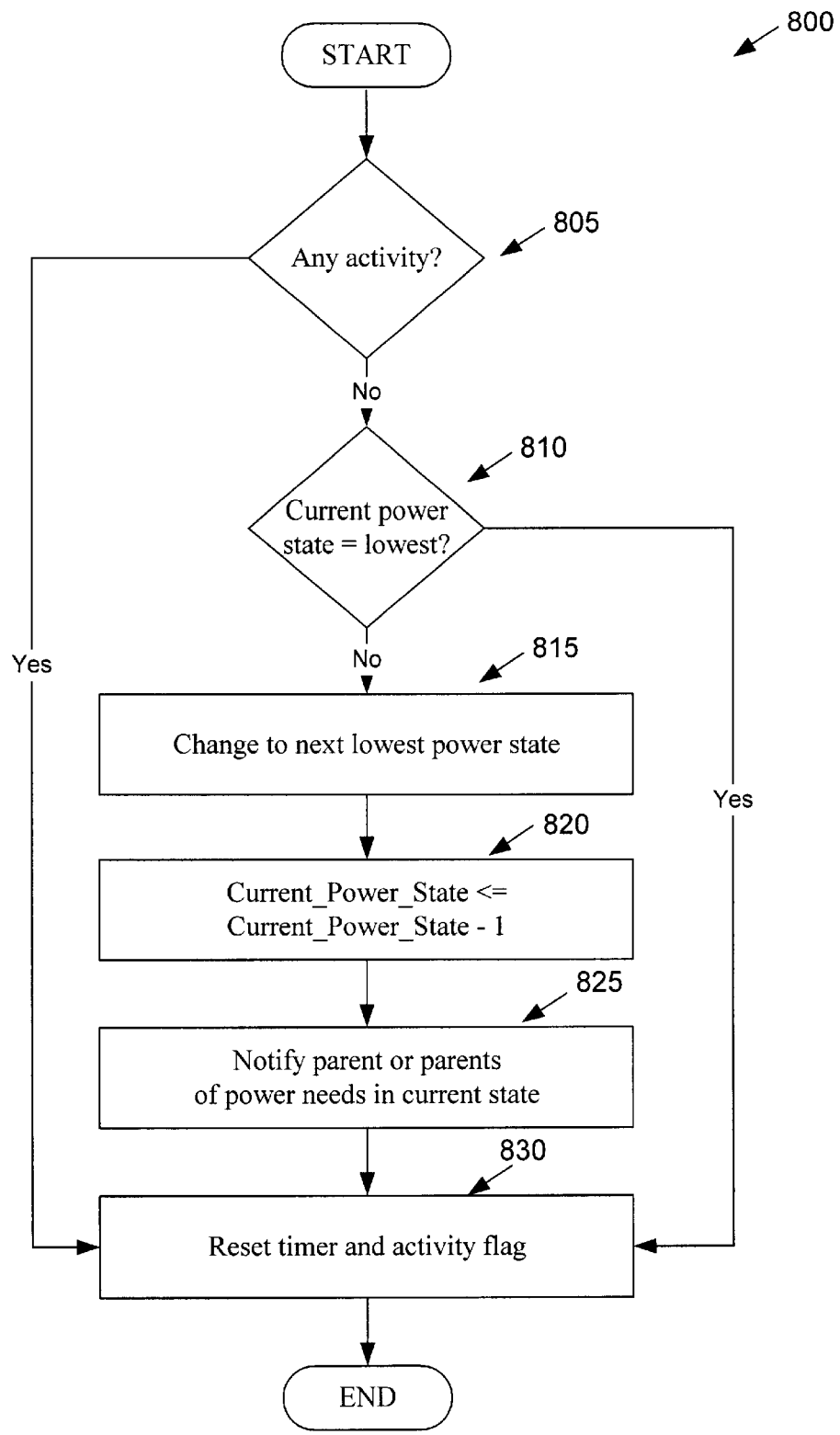
FIG. 8 illustrates a process for reducing the power state of a device due to its inactivity.
Figure 9:
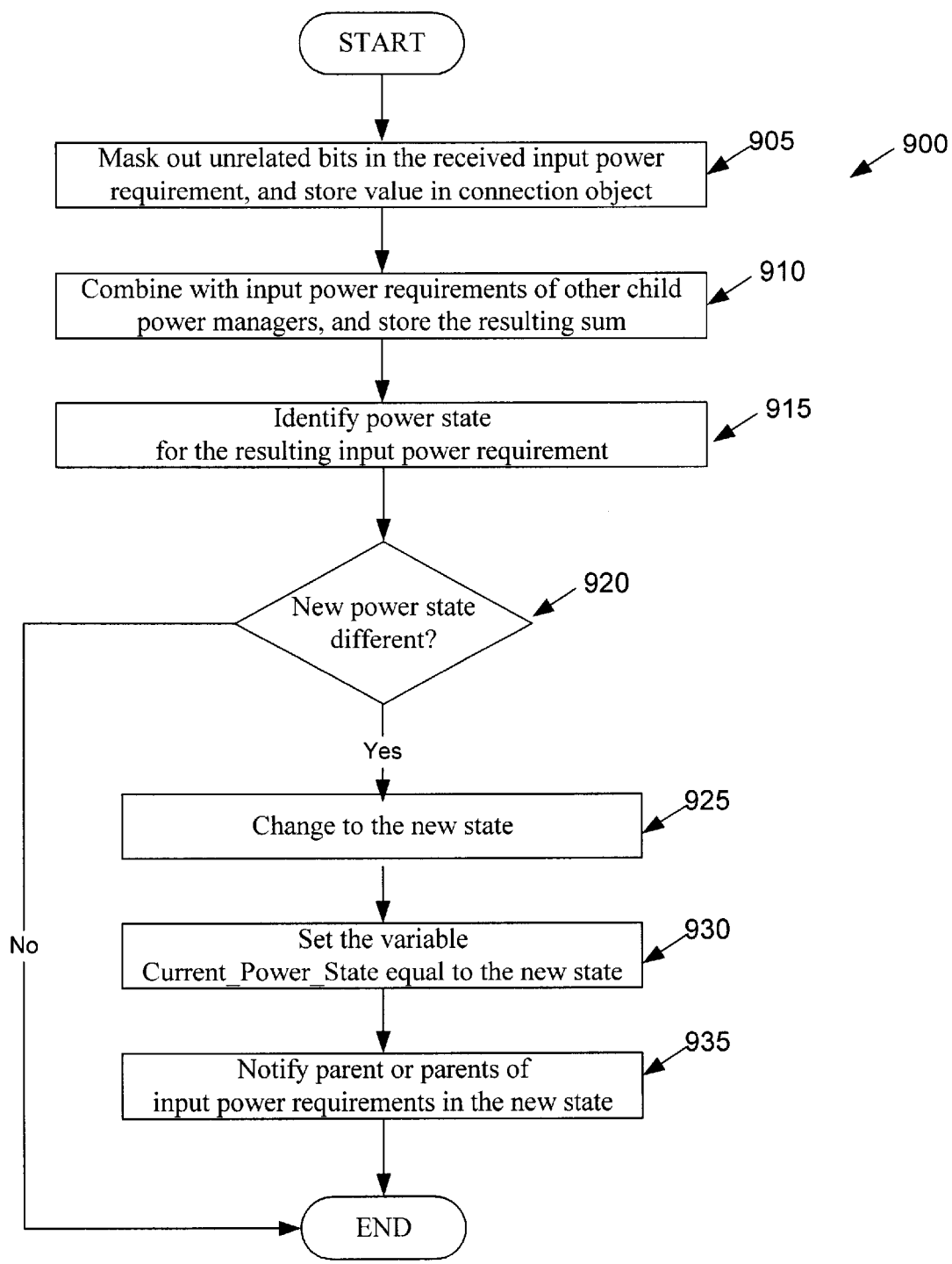
FIG. 9 presents a process performed by a power manager of a power domain when it is notified by one of its member domains or devices that it has reduced its input power requirements.

FIGS. 8 and 9 illustrate the processes for powering down devices and power domains due to the inactivity of the devices. These processes can be viewed as bottom-up processes since the power reduction propagates from the devices up to the root power node.

FIG. 8 illustrates a process 800 that a power manager 315 performs to power down its device when the device has been inactive. This process repeatedly starts at predetermined time intervals that are defined by the expiration of a timer. This timer is initially set when the computer system is initially turned on, and is thereafter set at the end of process 800, as further described below.

Once the process 800 starts, it initially determines (at 805) whether the activity flag of the power manager object has been set. This flag is reset at boot-up and at the end of process 800. The power-controlling driver sets this flag if the device is active (i.e., has at least one activity) during the time interval measured by the timer. Hence, the process 800 uses the timer and the activity flag to determine whether the device has been idle for a duration of time. One of ordinary skill will understand that alternative techniques can also be used to determine the idleness of devices. For instance, instead of using activity flags, some embodiments use predicative methods, while others reset the activity timer after each activity. Also, in some embodiments, the power-management client instructs the device's power manager that the device is no longer needed.

If the process 800 determines (at 805) that there was activity during the predetermined time interval, the process transitions to 830, where it resets the timer and the activity flag. On the other hand, if the process determines (at 805) that there was no activity (i.e., that the activity flag was not set), the process determines (at 810) whether the device is in its lowest power state. The process makes this determination by comparing the current power state value 705 to the lowest power state value of the device. Some embodiments define the lowest power state to be state 0. Hence, in these embodiments, the process determines (at 810) whether the current power state variable equals 0.

If the device is in its lowest power state, the process transitions to 830 to reset the timer and the activity flag. Otherwise, the process asks (at 815) the power-controlling driver to reduce the power of the device to the next lowest state. Next, the process decrements (at 820) the current power state variable by 1.

The process then sends (at 825) its device's input power requirements in its current, decremented state to its parent power manager or managers. The process retrieves its device's input power requirement in its current, decremented power state from the power array object 765 that corresponds to the current, decremented power state. The process next transitions to 830 to reset the timer and the activity flag. The process then ends.

FIG. 9 presents a process 900 performed by a power manager of a power domain. This process starts when the power manager receives from one of its child power managers (i.e., a power manager of one of its member domains or devices) reduced input power requirements.

After receiving the new input power requirements, the process 900 initially (at 905) masks out the portion of the child's input power requirement that does not relate to the process' power manager, and stores the resulting value in the connecting object for the child. Next, the process (at 910) (1) retrieves all the input power requirements of its children from their corresponding connecting objects, (2) adds the retrieved values, and (3) stores this sum in the aggregate field 720 of its power manager's data structure.

The process then identifies (at 915) the power state corresponding to the aggregate input power requirement that the process computed at 910. In other words, at 915, the process identifies the power array entry 765 that has an output power characteristic equal to the aggregate input power requirement generated at 910. The position of the identified entry specifies the power state for the process' power manager.

The process then determines (at 920) whether the power state identified at 915 is different from the current power state, which is stored in field 705 of data structure 700. If not, the process ends. Otherwise, the process instructs (at 925) its power-controlling driver 410 to change its domain's power level to the power state identified at 915.

Next, the process (at 930) sets the current power state equal to the new power state identified at 915, and stores the current power state in field 705 of the data structure 700. If the process' power manager is not the root power manager, the process sends (at 935) its domain's input power requirements for the power state identified at 915, to its parent power manager or managers. The process retrieves its domain's new input power requirement from the power array entry 765 that corresponds to the current, decremented power state. After notifying its parent power manager or managers, the process ends.

Figure 10:
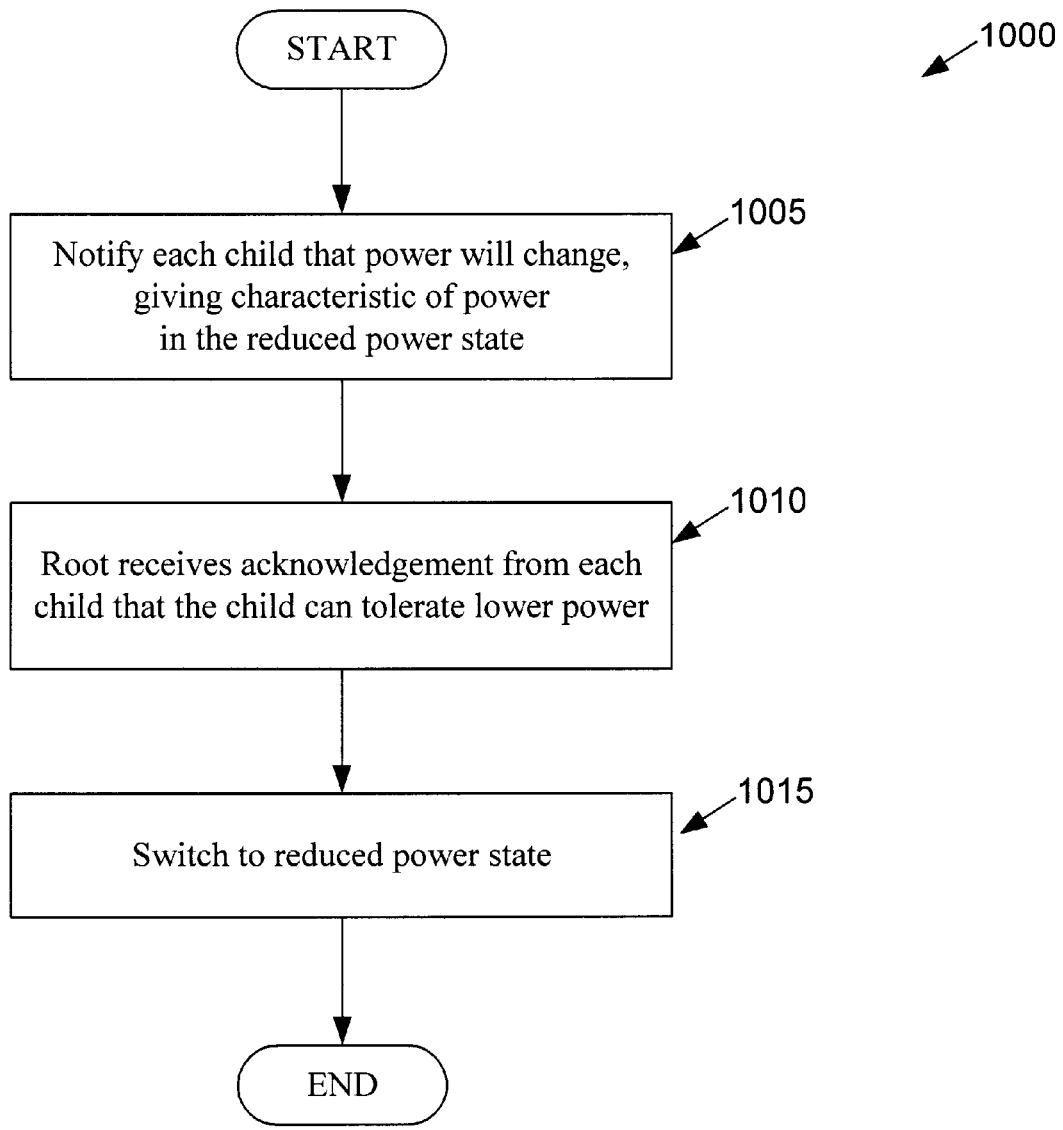
FIG. 10 presents a process performed by a root power manager to carry out a power-down-on-request procedure.
Figure 11:
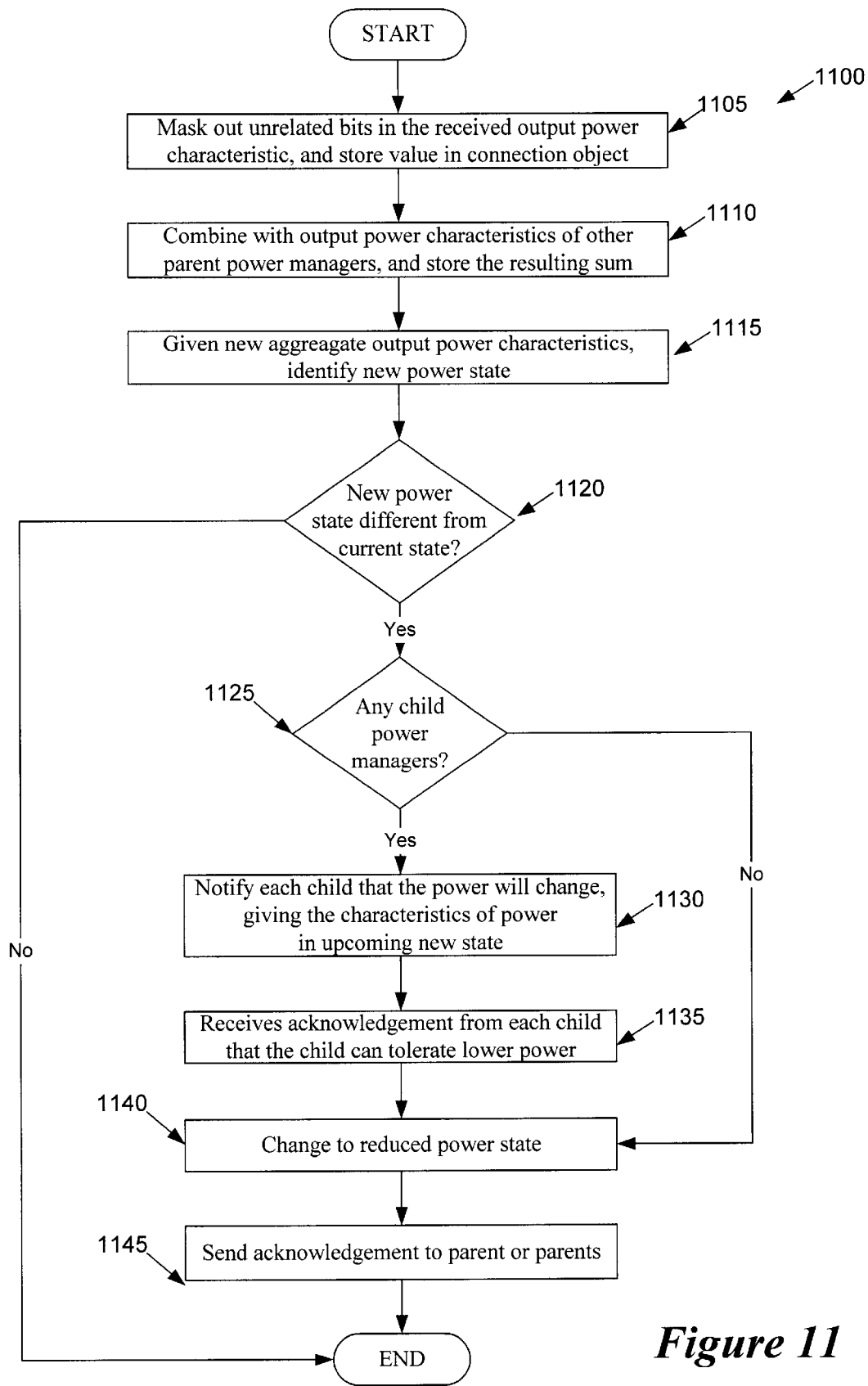
FIG. 11 presents a process that the non-root power managers perform to carry out a power-down-on-request procedure.

FIGS. 10 and 11 illustrate the power-down-on-request procedure used in some embodiments of the invention. As further described below, in such a procedure, the power-down request propagates down that power manager object hierarchy, and the power-down acknowledgments propagate up this hierarchy.

FIG. 10 presents a process 1000 that the root power manager $415_R$ performs to carry out the power-down request procedure. This process starts when the root power manager receives notification from one of the power management clients to reduce the system's power state (e.g., to turn off the system or to put the system to sleep). The power management clients might make such a request for a variety of reasons, such as the automatic or manual generation of sleep command, the closing of the laptop, or the detection of low battery level.

Once the process 1000 starts, it initially notifies (at 1005) each of the root's child power managers that the power will change. In its notification, the process provides the output power characteristics of the root power node in the upcoming reduced power state. The process then transitions to 1010, where it remains until the root power manager receives acknowledgments from each of its child power managers that their domains or devices can tolerate the upcoming reduced power state. In some embodiments, each child power manager provides its input power requirements in the reduced power state when it wants to acknowledge that it can tolerate this power state. The root power manager then analyzes the received input power requirements to deduce that its child power managers can tolerate the reduced power state.

Once the process 1000 receives acknowledgments from all its child power managers, it switches (at 1015) to that reduced power state, and then ends. To switch to the new power state, the process 1000 (1) instructs its corresponding power-controlling driver 410 to change the root domain's power level to the reduced power state, (2) changes its current power state value to the reduced power state, and (3) stores this value in field 705 of its data structure 700.

FIG. 11 presents a process 1100 that the non-root power managers perform to carry out a power-down-on-request procedure. Each non-root power manager starts this process whenever it receives notification from a parent power manager that it will lower its output power characteristics.

Once the process 1100 starts, the non-root power process initially (at 1105) masks out the portion of the parent's output power characteristic that does not relate to the process' power manager, and stores the resulting value in the connecting object for the parent. Next, the process (at 1110) (1) retrieves all the output power characteristics of its parents from their corresponding connecting objects, (2) adds the retrieved values, and (3) stores this sum in the aggregate field 715 of its power manager's data structure.

The process then identifies (at 1115) the power state corresponding to the aggregate output power characteristic computed at 1110. In other words, at 1115, the process identifies the power array entry 765 that has an input power requirement equal to the aggregate output power characteristic generated at 1110. The position of the identified entry specifies the power state for the process' power manager.

The process then determines (at 1120) whether the power state identified at 1115 is different from its current state, which is stored in its data structure field 705. If not, the process ends. Otherwise, the process determines (at 1125) whether its power manager has any child power managers.

If not, the process transitions to 1140, which will be described below. On the other hand, if the process' power manager has child power mangers, the process notifies (at 1130) each of the child managers that the power will change. In its notification, the process provides its new output power characteristics in the upcoming reduced power state. The process then transitions to 1135, where it remains until it receives acknowledgments from each of the notified child power managers that their domain or device can tolerate the upcoming reduced power state. In some embodiments, the child power managers acknowledge their tolerance for the reduced power state by providing the process with their input power requirements for this state. The process 1100 can then examine its power array 750 and determine that the new input power requirements of its child managers correspond to the desired reduced power state.

Once the process 1100 determines that all its children have acknowledged its message or that it does not have any children, the process transitions to 1140 to switch to its reduced power state. To switch to the new power state, the process 1100 (1) instructs its corresponding power-controlling driver 310 or 410 to change its domain's or device's power level to the reduced power state, (2) changes its current power state value to the reduced power state, and (3) stores this value in field 705 of its data structure 700.

The process then acknowledges (at 1145) to its parent power manager or managers that its device or domain is in the new reduced power state. In some embodiments, the process 1100 provides this acknowledgment by notifying its parent power manager or managers of its input power requirements in its new power state. After acknowledging its domain's or device's new power state, the process 1100 ends.

Figure 12:
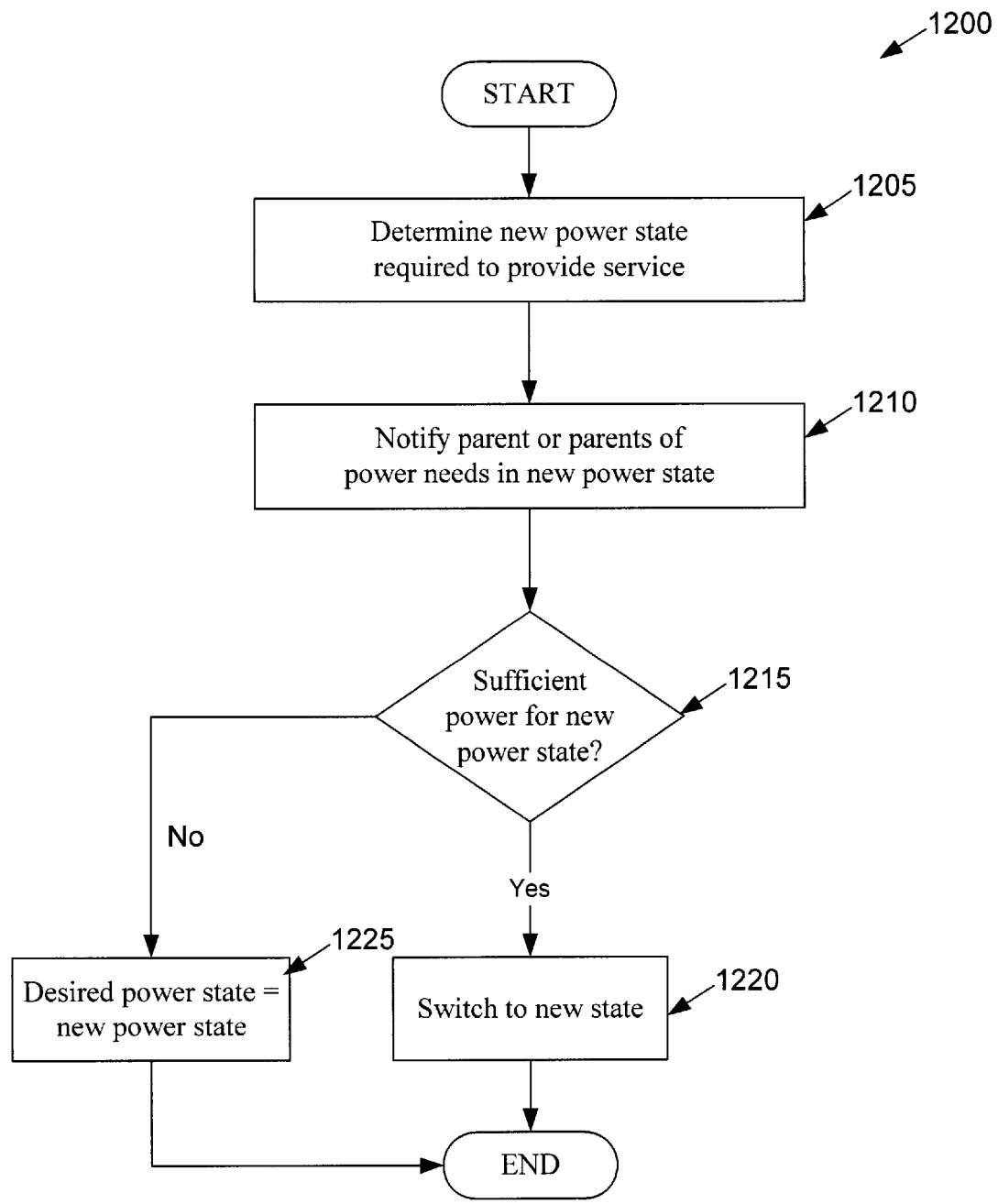
FIG. 12 presents a process that a device's power manager performs to power up a device.
Figure 13:
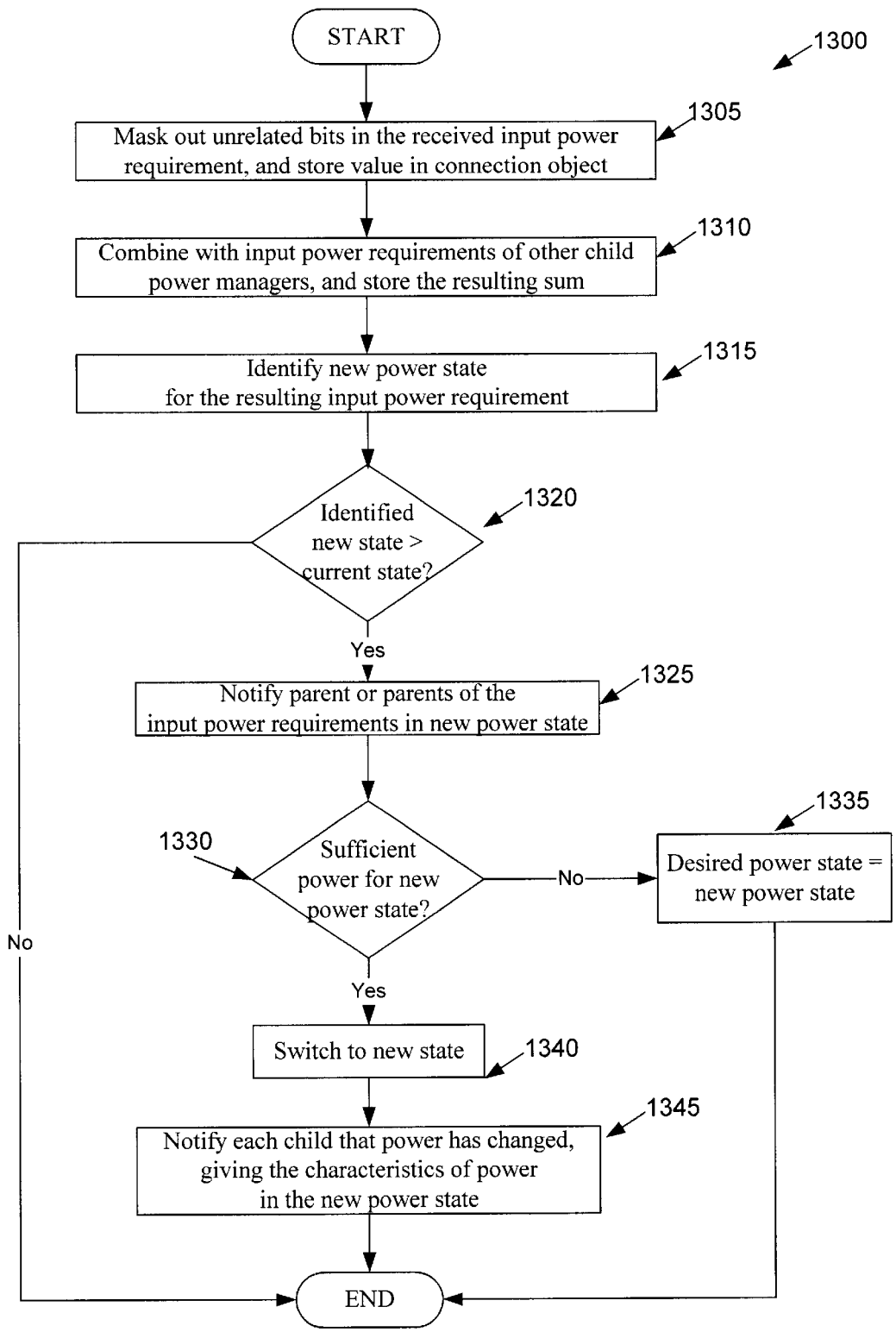
FIG. 13 illustrates a process a non-device power manager performs when one of its child power managers notifies it of its higher input power requirements.
Figure 14:
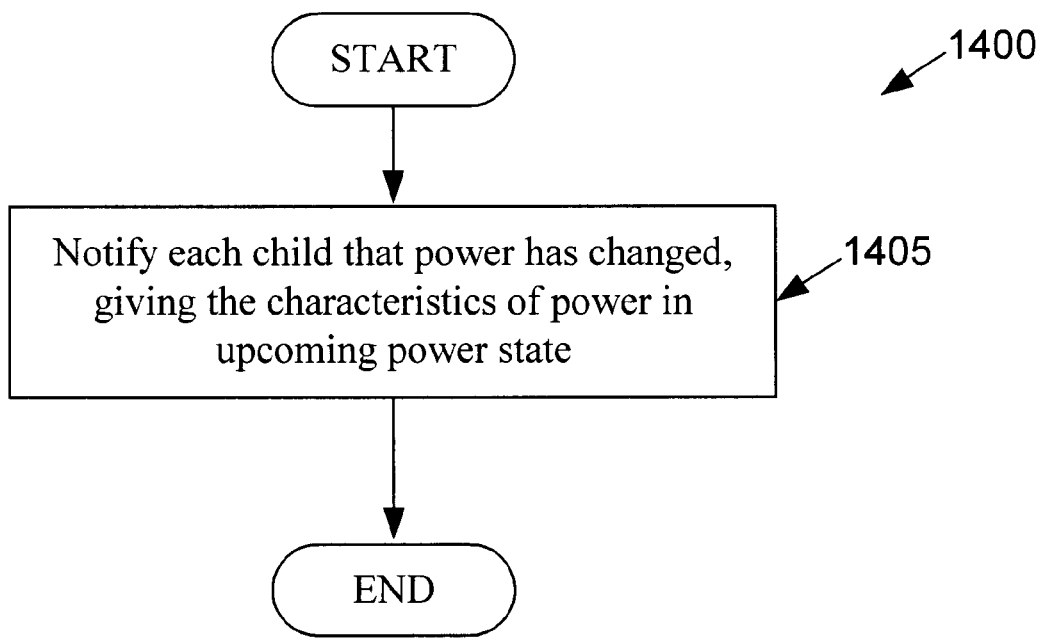
Figure 15:
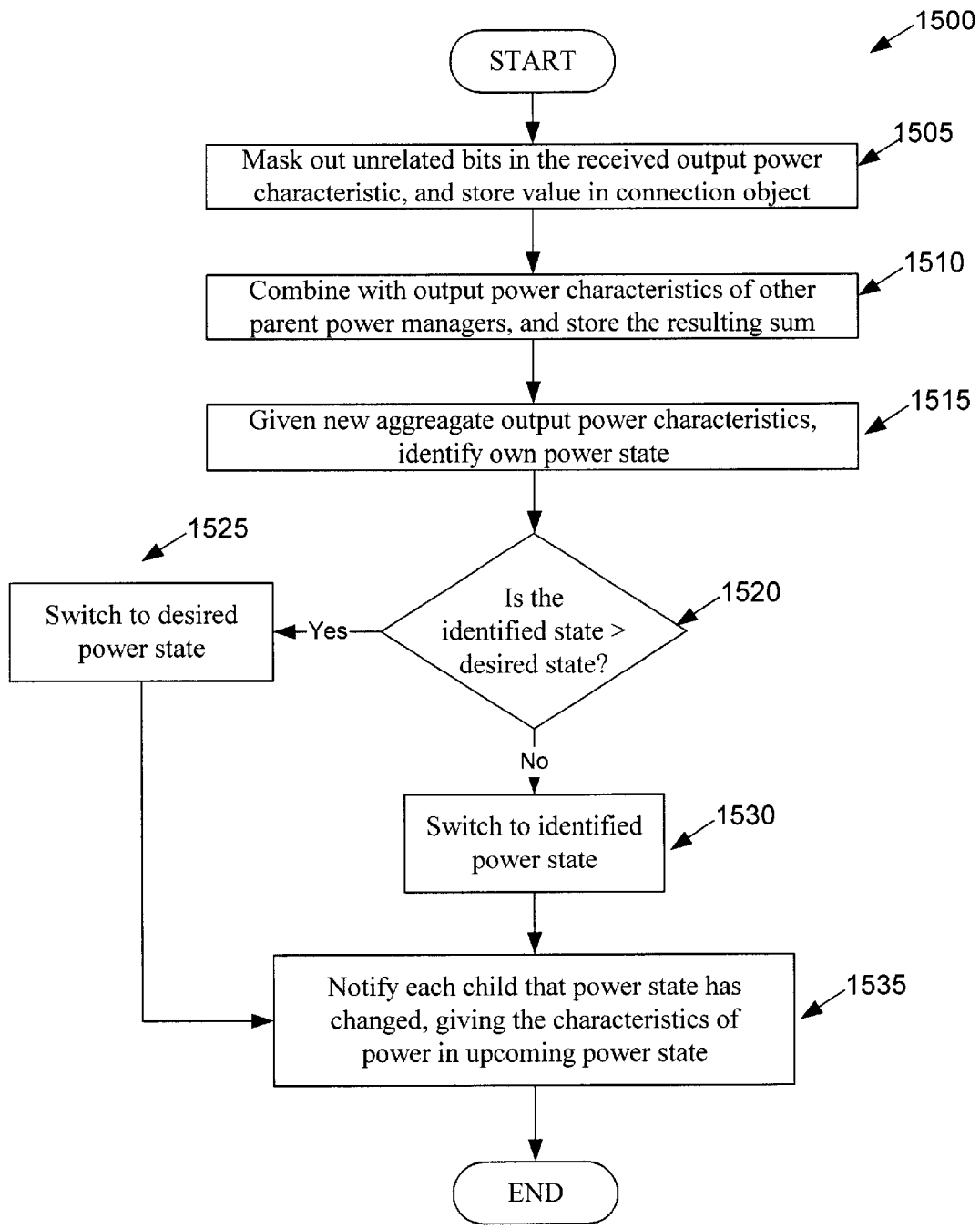
FIG. 15 illustrates a process a non-root power manager performs when it receives notification from its parent that the parent has raised its output power characteristic.

FIGS. 12–15 illustrate several processes for powering up the system. Of these figures, FIGS. 12, 13, and 15 illustrate the processes for powering up a device that was previously in a sleep state. Specifically, FIG. 12 presents a process 1200 that a device's power manager 315 performs to power up a device in the sleep state. This process 1200 starts when the device's power manager receives notification that the services of its device are needed by some client application.

After starting, the process 1200 initially determines (at 1205) the new power state required to provide the requested service. Next, the process notifies (at 1210) its parent power manager or managers of its new input power requirements in its new power state. As further described below, each parent power manager notes this new input power requirement in the connecting object for the device and the parent.

The process then determines (at 1215) whether its parents' current output power is sufficient to power the device in its new state. In some embodiments, the process 1200 retrieves its parents' current output power from field 715 of its power manger's data structure 700.

If the process determines that the parents' output power is sufficient, the process switches (at 1220) to the new power state, and then ends. To switch to the new power state, the process 1200 (1) instructs its corresponding power-controlling driver 310 to change the its device's power level to the reduced power state, (2) changes its current power state value to the reduced power state, and (3) stores this value in field 705 of its data structure 700.

On the other hand, if the process determines (at 1215) that the parents' output power is not sufficient, the process sets (at 1225) the desired power state 710 to the state identified at 1205, and then ends without switching to the new power state. In this situation, the device's power manager switches to the new power state after it receives notification from its parent power manager or managers that the parent power manager or managers have increased their output power characteristics, as further described below by reference to FIG. 15.

FIG. 13 illustrates a process 1300 that a non-device power manager performs when one of its child power managers notifies it of its higher input power requirements. The process 1300 starts after receiving such notice. The process 1300 initially (at 1305) masks out the portion of the child's input power requirements that does not relate to the process' power manager, and stores the resulting value in the connecting object for the child. Next, the process (at 1310) (1) retrieves all the input power requirements of its children from their corresponding connecting objects, (2) adds the retrieved values, and (3) stores this sum in the aggregate field 720 of its power manager's data structure.

The process then identifies (at 1315) the power state corresponding to the aggregate input power requirement that the process computed at 1310. In other words, at 1315, the process identifies the power array entry 765 that has an output power characteristic equal to the aggregate input power requirement generated at 1310. The position of the identified entry specifies the power state for the process' power manager.

The process then determines (at 1320) whether the power state identified at 1315 is greater than the current power state, which is stored in field 705 of data structure 700. If not, the process ends. Otherwise, for non-root power managers, the process 1300 then notifies (at 1325) its parent power manager or managers of its input power requirement in the desired power state identified at 1315. This input power requirement is necessary to satisfy the requesting child's new input power requirement. The non-root power manager retrieves its desired input power requirement for the identified power state from its power array at the entry 765 corresponding to the desired higher power state. The root power manager does not perform 1325 since it does not have a parent to notify.

The process 1300 then determines (at 1330) whether its parents' output power is sufficient to power its domain in the new power state. In some embodiments, the process 1300 retrieves its parents' current output power from field 715 of its power manger's data structure 700.

If the process determines that the parents' output power is sufficient, the process switches (at 1340) to the new power state. To switch to the new power state, the process 1300 (1) instructs its corresponding power-controlling driver 410 to change the its domain's power level to the higher power state, (2) changes its current power state value to the higher power state, and (3) stores this value in field 705 of its data structure 700. The process then notifies (at 1345) each of its child power managers that it has changed power states, and gives them its current output power characteristic in its new power state. After 1345, the process then ends.

On the other hand, if the process determines (at 1330) that the parents' output power is not sufficient, the process sets (at 1335) the desired power state 710 to the state identified at 1315, and then ends without switching to the new power state. In this situation, the non-root power manager switches to the new power state after it receives notification from its parent power manager or managers that the parent manager or managers have increased their output power characteristics, as further described below by reference to FIG. 15.

FIG. 14 illustrates a process 1400 that the root power manager performs when the computer system turns on. As shown in FIG. 14, this process simply notifies (at 1405) each of the root power manager's child managers that the root power manager has changed states. With this notice, the root power manager also provides its output power characteristic in its new power state. In some embodiments, the root power domain has only two states, an off state and on state. In other embodiments, the root power domain also has a sleep state.

FIG. 15 illustrates a process 1500 that a non-root power manager performs when it receives notification from a parent power manager that the parent power manager has raised its output power characteristic. The process 1500 initially (at 1505) masks out the portion of the parent's output power characteristic that does not relate to the process' power manager, and stores the resulting value in the connecting object for the parent. Next, the process (at 1510) (1) retrieves all the output power characteristics of its parents from their corresponding connecting objects, (2) adds the retrieved values, and (3) stores this sum in the aggregate field 715 of its power manager's data structure.

The process then identifies (at 1515) the power state corresponding to the aggregate output power characteristic computed at 1510. In other words, at 1515, the process identifies the power array entry 765 that has an input power requirement equal to the aggregate output power characteristic generated at 1510. The position of the identified entry specifies the power state for the process' power manager.

The process then determines (at 1520) whether the power state identified at 1515 is greater than the desired state stored in field 710 of the power manager data structure. If so, the process prepares (at 1525) to switch to the desired power state. Otherwise, the process prepares (at 1530) to switch to the identified power state.

From 1525 and 1530, the process transitions to 1535 to notify each of its power manager's children that the power manager has changed states. With this notice, the process provides the output power characteristic of its power manager in the switched state. The process then ends.

Figure 16:
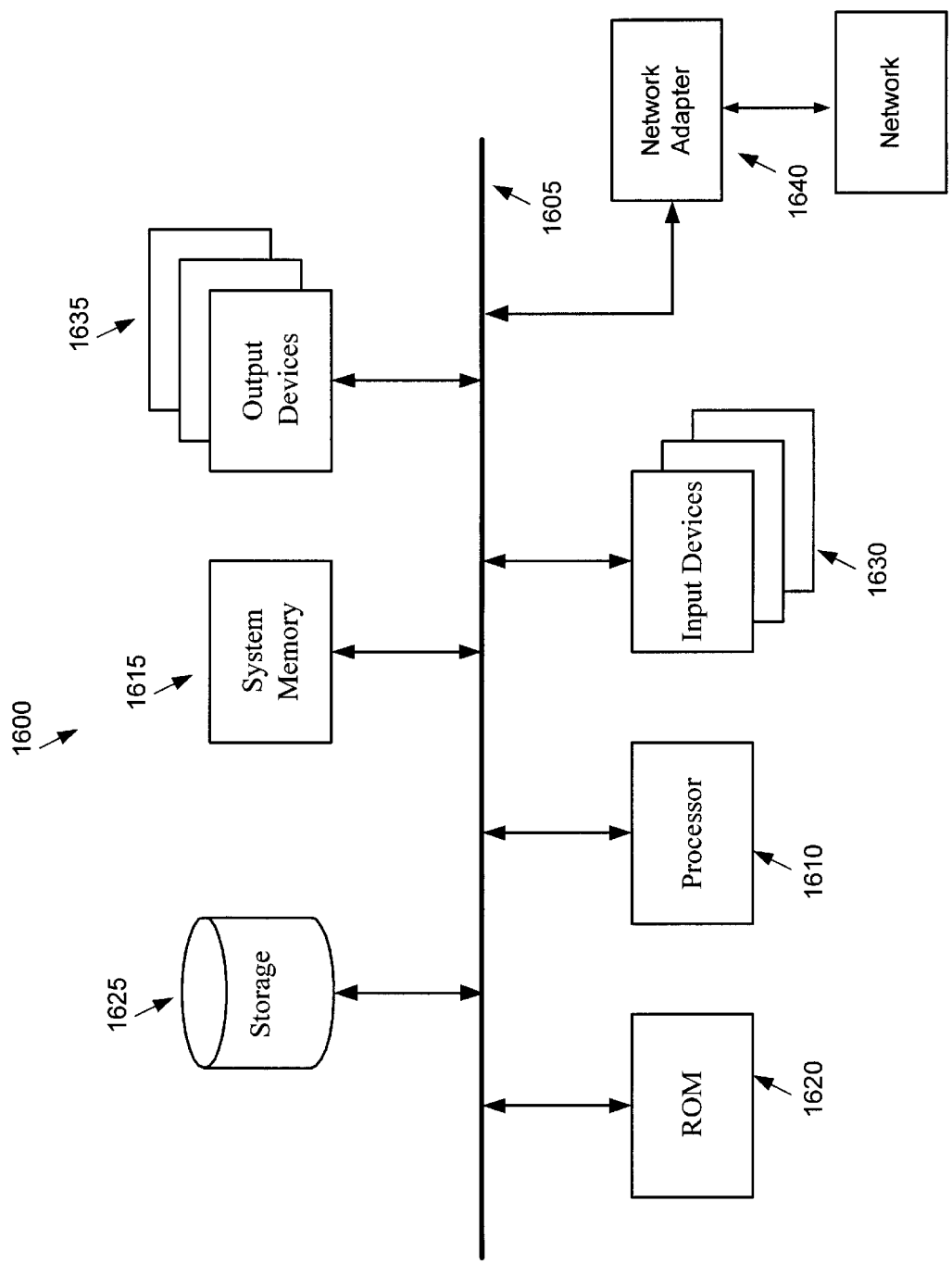
FIG. 16 presents one example of a computer that can be used in conjunction with the invention.

FIG. 16 presents one example of a computer 1600. This computer 1600 includes a bus 1605, a processor 1610, a system memory 1615, a read-only memory 1620, a permanent storage device 1625, input devices 1630, and output devices 1635. The bus 1605 collectively represents all system, peripheral, and chipset buses that communicatively connect the numerous internal devices of the computer 1600. For instance, the bus 1605 communicatively connects the processor 1610 with the read-only memory 1620, the system memory 1615, and the permanent storage device 1625.

From these various memory units, the processor 1610 retrieves instructions to execute and data to process in order to execute the processes of the invention. The read-only-memory (ROM) 1620 stores static data and instructions that are needed by the processor 1610 and other modules of the computer. The permanent storage device 1625, on the other hand, is read-and-write memory device. This device is a non-volatile memory unit that stores instruction and data even when the computer 1600 is off. Some embodiments of the invention use a mass-storage device (such as a magnetic or optical disk and its corresponding disk drive) as the permanent storage device 1625. Other embodiments use a removable storage device (such as a floppy disk or zip® disk, and its corresponding disk drive) as the permanent storage device.

Like the permanent storage device 1625, the system memory 1615 is a read-and-write memory device. However, unlike storage device 1625, the system memory is a volatile read-and-write memory, such as a random access memory. The system memory stores some of the instructions and data that the processor 1610 needs at runtime. In some embodiments, the invention's processes are stored in the system memory, the permanent storage device 1625, and/or the read-only memory 1620.

The bus 1605 also connects to the input and output devices 1630 and 1635. The input devices enable the user to communicate information and select commands to the computer. The input devices 1630 include an alphanumeric keyboard and a cursor-controller (such as a mouse or a touch-pad). The output devices 1635 display images generated by the computer. The output devices include printers and display devices, such as cathode ray tubes (CRT) or liquid crystal displays (LCD).

Finally, as shown in FIG. 16, bus 1605 also couples to a network adapter 1640. The network adapter connects the computer 1600 to a network of computers (such as a local area network ("LAN"), a wide area network ("WAN"), or an Intranet) or a network of networks (such as the Internet). One of ordinary skill in the art will appreciate that the invention can be used to manage the power of computers that have different configurations and/or components than those of the computer 1600 of FIG. 16.

The invention provides a distributed power management architecture for a computer system. This architecture has a simple structure and operation, and imposes minimal development and maintenance requirements.

For instance, each power manager only needs to know about its respective device or domain, in the embodiments (1) that provide a power manager for each device and power domain, and (2) that interrelate these power managers through a hierarchical relationship which mimics the hierarchical power distribution architecture. Hence, when a device driver is modified or a new driver or. device is added, only the small and discrete power manager for that device needs to be modified or added. In addition, other than having to respond to their parents and children, the power managers of these embodiments do not need to have detailed information about the hierarchical relationships of the domains and devices.

One of ordinary skill will also recognize that the invention can be embodied in other specific forms without departing from the spirit of the invention, even though the invention has been described with reference to numerous specific details. In view. of the foregoing, one of ordinary skill in the art will understand that the invention is not to be limited by the foregoing illustrative details, but rather is to be defined by the appended claims.

I claim:

1. A power management system for a computer system, said computer system having a device and a power domain, said power management system comprising:
    a) a first power manager determining when to change a power state of said device; and
    b) a second power manager determining when to change a power state of said power domain;
    c) wherein the device receives power from the power domain, and the first power manager determines when to change the power state of said device based on information that the first power manager receives from the second power manager.

2. The power management system of claim 1 further comprising:
   a) a first power-controlling driver communicatively coupled to said first power manager, said first power-controlling driver receiving instructions from the first power manager to change the power state of the device; and
   b) a second power-controlling driver communicatively coupled to said second power manager, said second power-controlling driver receiving instructions from the second power manager to change the power state of the power domain.

3. The power management system of claim 1 further comprising a power management client, wherein the first power manager determines when to change the power state of said device based on information that the first power manager receives from the power management client.

4. The power-management system of claim 1, wherein said information is the information about the power that the power domain supplies to the device.

5. The power management system of claim 1, further comprising a first power-controlling driver communicatively coupled to said first power manager, said first power-controlling driver receiving instructions from the first power manager to change the power state of the device, wherein the first power manager determines when to change the power state of said device based on information that the first power manager receives from the first power-controlling driver.

6. The power management system of claim 1 further comprising a power management client, wherein the second power manager determines when to change the power state of said domain based on information that the second power manager receives from the power management client.

7. The power management system of claim 1, further comprising a power-controlling driver communicatively coupled to said second power manager, said power-controlling driver receiving instructions from the second power manager to change the power state of the domain, wherein the second power manager determines when to change power state of said power domain based on information that the second power manager receives from the power-controlling driver.

8. A power management system for a computer system, said computer system having a device and first and second power domains, wherein the second power domain supplies power to the first power domain, said power management system comprising:
   a) a first power manager determining when to change a power state of said device;
   b) a second power manager determining when to change a power state of said first power domain; and
   c) a third power manager determining when to change a power state of said second power domain,
   wherein the second power manager determines when to change the power state of said first power domain based on information that the second power manager receives from the third power manager.

9. The power-management system of claim 8, wherein said information is the information about the power that the second power domain supplies to the first power domain.

10. A hierarchical and distributed power management system for a computer system, said computer system having a hierarchical power system that includes devices and power domains, wherein said devices and power domains have a particular hierarchical relationship, said power management system comprising:
    a power manager for each device, wherein a device's power manager determines when to change a power state of its device; and
    a power manager for each power domain, wherein each domain's power manager determines when to change a power state of its power domain;
    wherein the power managers of the devices and power domains have a hierarchical relationship that is similar to the hierarchical relationship of the devices and power domains; and
    wherein the power managers of the devices and power domains communicate with each other based on the hierarchical relationship of the power managers.

11. The power management system of claim 10 further comprising:
    a) a power-controlling driver for each device, wherein a device's power-controlling driver receives instructions from the device's power manager to change the power state of the device; and
    b) a power-controlling driver for each power domain, wherein a domain's power-controlling driver receives instructions from the domain's power manager to change the power state of the power domain.

12. The power management system of claim 10 further comprising a power management client, wherein at least one of said power managers determines when to change the power state of the power manager's corresponding device or domain based on information that the power manager receives from the power management client.

13. The power management system of claim 10, wherein a particular one of said devices receives power from a particular one of said power domains, and the power manager for the particular device determines when to change the power state of said particular device based on information that the power manager for the particular device receives from the power manager for the particular power domain.

14. The power-management system of claim 13, wherein said information is the information about the power that the particular power domain supplies to the particular device.

15. The power management system of claim 10, further comprising a power-controlling driver for each device, wherein a first power manager for a first device determines when to change the power state of the first device based on information that the first power manager receives from the power-controlling driver of the first device.

16. The power management system of claim 10, wherein a first power domain receives power from a second power domain, and the power manager for the first power domain determines when to change the power state of the first power domain based on information that the power manager for the first power domain receives from the power manager for the second power domain.

17. The power-management system of claim 16, wherein said information is the information about the power that the second power domain supplies to the first power domain.

18. The power management system of claim 10, further comprising a power-controlling driver for each power domain, wherein a first power manager of a first domain determines when to change the power state of the first domain based on information that the first power manager receives from the power-controlling driver of the first domain.

* * * * *

UNITED STATES PATENT AND TRADEMARK OFFICE
CERTIFICATE OF CORRECTION

PATENT NO. : 6,802,014 B1
DATED : October 5, 2004
INVENTOR(S) : Suurballe

It is certified that error appears in the above-identified patent and that said Letters Patent is hereby corrected as shown below:

Title page,
Item [54], Title, "METHOD AND APPARATUS FOR MANAGING POWER IN COMPUTER SYSTEMS" should read -- A HIERARCHICAL POWER MANAGEMENT SYSTEM FOR CONTROLLING THE POWER STATES OF INDIVIDUAL DEVICES AND DOMAINS. --

Signed and Sealed this

Fourth Day of January, 2005

JON W. DUDAS
*Director of the United States Patent and Trademark Office*